United States Patent [19]
Olson et al.

[11] Patent Number: 4,726,729
[45] Date of Patent: Feb. 23, 1988

[54] ELECTRIC MOTOR-ACTUATED LOAD CLAMP WITH CLAMPING FORCE CONTROL

[75] Inventors: John E. Olson, Portland; Donald E. Van Beek, Oregon City, both of Oreg.

[73] Assignee: Cascade Corporation, Portland, Oreg.

[21] Appl. No.: 859,062

[22] Filed: May 2, 1986

[51] Int. Cl.⁴ ............................................. B25J 15/02
[52] U.S. Cl. ................................. 414/621; 294/907; 414/730
[58] Field of Search ................. 294/907, 119.1, 67.22; 414/621, 730, 631, 417, 416

[56] References Cited
U.S. PATENT DOCUMENTS

| | | | |
|---|---|---|---|
| 2,959,445 | 8/1959 | Breslav | 294/86 |
| 3,815,761 | 6/1974 | Adam | 214/1 |
| 3,824,440 | 7/1974 | McIntosh | 318/696 |
| 4,600,357 | 7/1986 | Coules | 414/730 |
| 4,621,331 | 11/1986 | Iwata | 414/730 |

FOREIGN PATENT DOCUMENTS

| | | | |
|---|---|---|---|
| 3332147 | 3/1985 | Fed. Rep. of Germany | 294/907 |
| 2527968 | 12/1983 | France | 294/119.1 |
| 918088 | 4/1982 | U.S.S.R. | 294/907 |

*Primary Examiner*—James T. McCall
*Attorney, Agent, or Firm*—Chernoff, Vilhauer, McClung & Stenzel

[57] ABSTRACT

An electric motor-actuated load clamp for automatically-guided vehicles has clamp arms which are selectively opened and closed by a plurality of rotary electric motors connected to the clamp arms by ball screws. Clamping force is accurately controlled by regulation of current to the electric motors, any of a number of different predetermined clamping forces being selectively obtainable. During clamping of a load, the electric motors are energized only a small fraction of the time according to a time-sequenced clamping and reclamping procedure, clamping force being otherwise maintained by a one-way brake. Further control features ensure against inaccuracy and overclamping due to current in-rush, and against malfunctions which could cause safety hazards.

13 Claims, 4 Drawing Figures

ELECTRIC MOTOR-ACTUATED LOAD CLAMP WITH CLAMPING FORCE CONTROL

BACKGROUND OF THE INVENTION

The present invention is directed to an electric motor-actuated load clamp for automatically-guided vehicles, and particularly to such a load clamp having accurate clamping force control and a high degree of reliablity and durability.

Most materials handling clamps, of the type for handling cartons, paper rolls and the like, are actuated by fluid power actuators under the control of valves which regulate the supply of pressurized fluid to the actuators. In such load-handling clamps it is important to apply enough clamping force to the load to ensure that it is not inadvertently released from the frictional grasp of the clamp arms, and yet insufficient clamping force to damage the load. The optimum clamping force to satisfy both objectives differs with the type of load, and therefore it is common for the control valves of fluid power clamps to have multiple settings to provide a plurality of different fluid pressures and thus different clamping forces.

Such fluid power actuators are not well adapted for clamp arm actuation when used with automatically-guided, driverless vehicles because of the expense and difficulty of interfacing them with a microprocessor so as to achieve the high accuracy of clamp arm actuation required for an automatic unit which lacks a human operator. Electrically-actuated load clamps are better adapted to this application, such as the electrically-actuated clamp disclosed in the commonly-owned U.S. patent application of one of the inventors herein, Ser. No. 677,929, filed Dec. 4, 1984.

Electrically-actuated load clamps in general are commonly used in many applications as evidenced, for example, by the clamps shown in U.S. Pat. Nos. 2,959,445 and 3,815,761, the latter including a current limiting device to limit the motor torque and thereby limit the gripping force exerted by the clamp. It is also known to sense the current level in an electric motor, or the electromagnetic field resulting therefrom, and to control the current level within a maximum and minimum range in response thereto as suggested, for example, in U.S. Pat. No. 3,824,440. However, such systems, if applied to a load clamp for an automatically-guided vehicle, would not enable the precise clamping force control necessary to ensure reliable load gripping while preventing overgripping, nor would they enable the accurate automatic selection of any of a plurality of different predetermined clamping forces for different types of loads. Moreover, such systems are not able to interrupt power to the motors automatically to prevent overheating during load clamping, while nevertheless ensuring continuity of adequate clamping force without overgripping throughout an extended period of time.

Related problems peculiar to an automatic clamp system, not dealt with by the prior art, include ensuring that the load is adequately gripped if there should be a malfunction in the clamp open/close control system, or a lack of uniform distribution of electric current among a plurality of clamping motors. Another problem for which a solution is needed is how to compensate for the effect on clamping force of transient current in-rush when the clamping motors are started.

SUMMARY OF THE PRESENT INVENTION

It is an object of the present invention to provide an electrically-actuated load clamp having accurate clamping force control, thereby ensuring both against inadvertent release of the load and against load damage from overgripping, and enabling selection of different predetermined clamping forces to accommodate different types of loads. Preferably, the control system senses clamping force by sensing current driving the clamping motors, and provides a current sense signal to a comparator which regulates the current controller in a feedback mode. (Alternatively, clamping force could be sensed within the scope of the invention by a mechanical transducer.) Current in-rush under start-up conditions is compensated for by time-delayed response of the feedback circuit, and total current to all electric motors operating in tandem is sensed so that a misleading current reading from nonuniform motor loading is avoided.

It is a further object of the present invention to provide an electrically-actuated load clamp which minimizes the likelihood of overheating of the electric clamping motors while ensuring the maintenance of adequate clamping force on a load to guard against inadvertent release. This is accomplished by current control circuitry which delivers effective current to the electric clamping motors until a desired clamping force has been exerted on the load, after which the effective current is interrupted for a predetermined period of time while the desired clamping force, initially established electrically, is maintained mechanically. The clamping force is momentarily reestablished electrically at predetermined intervals in a reclamping mode to ensure that the clamping force is being maintained. In the reclamping mode, current is supplied in a gradually increasing amount up to a reduced limit to compensate for current in-rush which would otherwise cause overclamping of the load.

It is a further object of the present invention to provide safeguards against inadvertent release of a load by different types of electrical malfunctions. Release of the load by a break in the clamp open/close directional control circuit is prevented by making clamp closure responsive to an open-circuit condition. Also, insufficient clamping force due to a lack of driving current to any one of a plurality of clamping motors causes automatic deactivation of all motors.

The foregoing and other objectives, features and advantages of the present invention will be more readily understood upon consideration of the following detailed description of the invention taken in conjunction with the accompanying drawings.

DESCRIPTION OF THE PREFERRED EMBODIMENT

Figure 1:
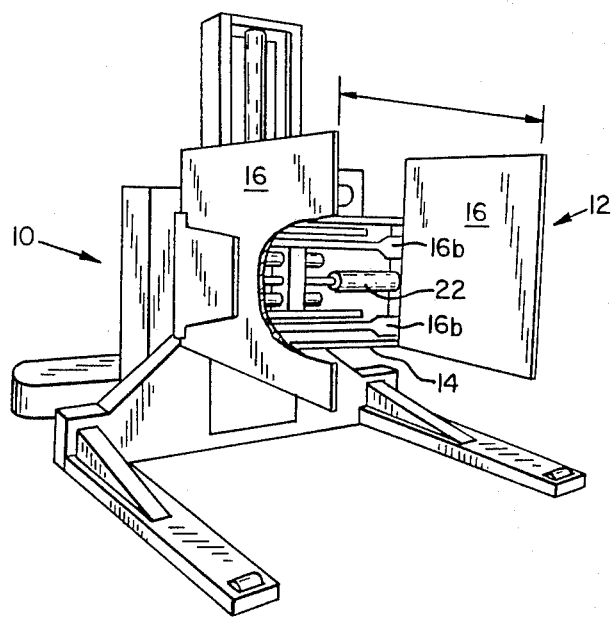
FIG. 1 is a perspective view of an exemplary embodiment of the electrically-actuated load clamp of the present invention, shown mounted on an automatically-guided vehicle.
Figure 2:
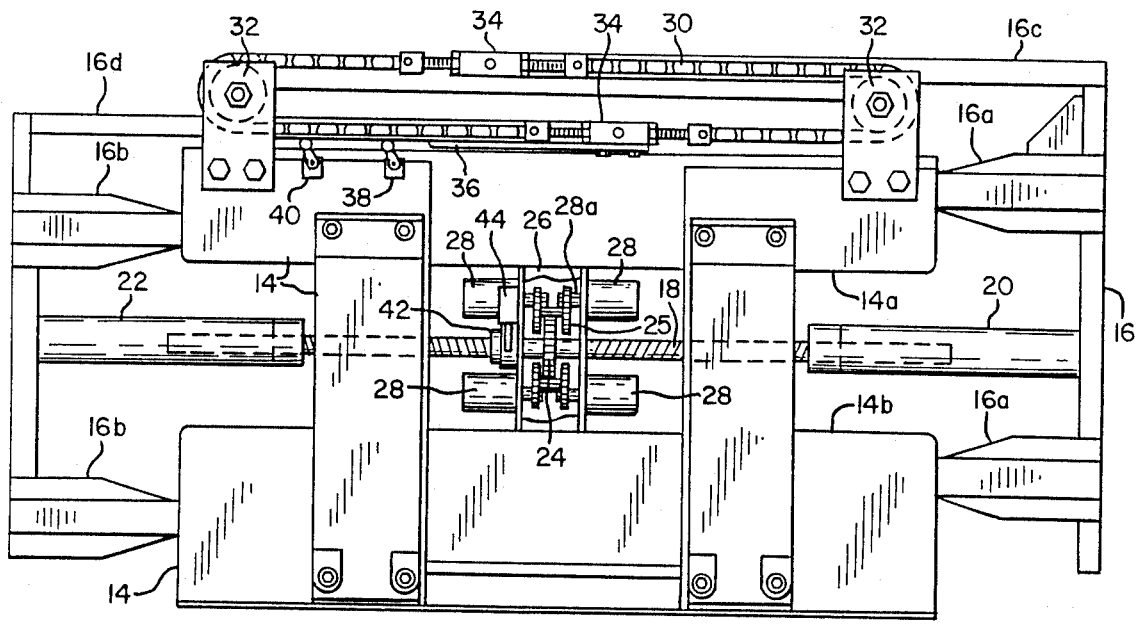
FIG. 2 is an enlarged rear view of the load clamp of FIG. 1.

FIG. 1 depicts an automatically-guided vehicle, indicated generally as 10, having an electric motor-actuated load clamp designated generally as 12 mounted thereon. With reference to FIGS. 1 and 2, the load clamp has a frame 14 extending vertically and transversely relative to the automatically-guided vehicle 10. A pair of forwardly-extending, openable and closeable clamp arms 16 are each slidably mounted on the frame 14 for transverse movement relative thereto by respective pairs of slides 16a and 16b which are slidably mounted on mating transverse channels (not shown) on the front face of the frame 14. The clamp arms 16 are selectively closed and opened by sliding alternatively toward or away from each other, respectively, in response to the rotation of a ball screw assembly which includes a screw member 18 having oppositely-threaded portions on each end engaging respective followers 20 and 22 affixed to the respective clamp arms. The screw member 18 has a drive gear 24 affixed to its central portion, surrounded by a housing 26 upon which are mounted a plurality of rotary electric motors 28, each having a respective pinion gear such as 28a engaging the gear 24 through a respective reduction gear 25. Rotation of the motors 28 in one direction in unison therefore acts through the gears 28a, 25 and 24 to rotate the screw member 18 to close the clamp arms by drawing them toward each other, while rotation of the motors 28 in the opposite direction opens the clamp arms by moving them apart.

The housing 26 engages the cross members 14a and 14b of the frame 14 so as to receive vertical support and resistance to axial pivoting from the frame. However, the housing 26 preferably has no fixed connection to the frame 14. Accordingly, to ensure that the clamp arms 16 remain centered on the frame 14, an endless referencing chain 30 is mounted on a pair of sheaves 32 affixed to the top of the frame 14. The chain 30 has a pair of links 34, each connected by a respective connecting rod 16c, 16d to a respective clamp arm 16. One of the links 34 also has an arm 36 affixed thereto for contacting a pair of limit switches 38 and 40 as the clamp arms are opened, for purposes to be described hereafter.

Also mounted on the housing 26 is a conventional one-way brake 42, preferably of the wrap-spring type, which normally permits rotation of the screw member 18 in a direction to close the clamp arms, but prevents rotation of the screw member 18 in the opposite direction unless released by actuation of a solenoid 44. Actuation of the solenoid to release the brake occurs only in response to actuation of the motors 28 in a direction to open the clamp arms 16.

Figure 3:
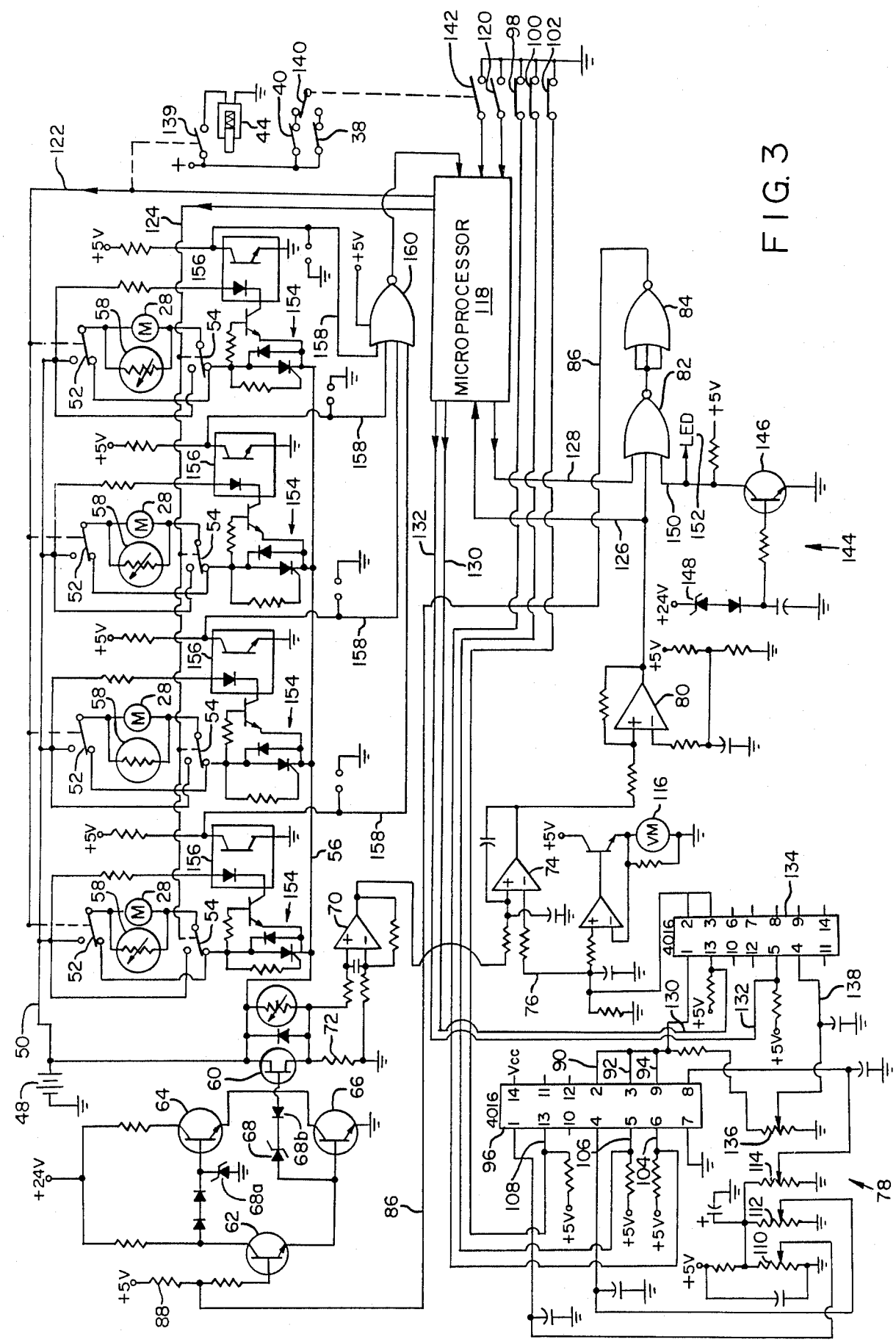
FIG. 3 is an exemplary embodiment of a microprocessor-controlled current-regulating circuit for the electric motors of the clamp of FIGS. 1 and 2.

FIG. 3 shows the circuitry for controlling current to the motors 28. Current from the battery or batteries 48 of the vehicle 10 is supplied through line 50 to relay switches 52 and 54 to each of the motors 28. In FIG. 3 the relays are all shown in their unactuated, or nonconducting, positions. Actuation of relay switches 52 from the position shown (without actuation of relays 54) directs current through motors 28 from line 50 to line 56 in a direction to open the clamp arms. Conversely, actuation of relays 54 from the position shown (without actuation of relays 52) directs current in the opposite direction through the motors 28 from line 50 to line 56 to close the clamp arms. Varistors 58 suppress transient current spikes to protect the electronic circuit.

The central element in the current control system is a power MOSFET 60, interposed between line 56 and ground, through which all current through the motors 28 must pass. Current through the MOSFET is controlled by the voltage on its gate, which in turn is controlled by transistor switches 62, 64 and 66 and their associated resistors, diodes and zener diodes. Such gate voltage will be either zero volts (preventing the MOSFET from conducting) or a predetermined positive voltage (causing the MOSFET to conduct). A zero gate voltage, preventing the MOSFET from conducting, is accomplished by placing a high voltage on the base of transistor 62, causing it likewise to place a high voltage on the base of transistor 66 and remove a high voltage from the base of transistor 64 which thus connects the gate of the MOSFET 60 to ground. Conversely, a positive conducting voltage on the gate of the MOSFET 60 is accomplished by placing a low voltage on the base of transistor 62, thereby switching both it and transistor 66 off while simultaneously placing a high voltage on the base of transistor 64 and thus turning it on. In summary, therefore, a high voltage at the base of transistor 62 turns the MOSFET 60 off, while a low voltage at the base of transistor 62 turns the MOSFET 60 on. Zener diodes 68 and 68a, and diode 68b, protect the MOSFET from excessive voltage on its gate.

Controlled rapid changing between high and low voltage at the base of transistor 62 results in corresponding controlled pulsing of the MOSFET 60 and like pulsing of the current through the motors, which pulsing can be used to control the effective amount of current driving the motors 28, thereby controlling their torque and the resultant clamping force. As used herein, the effective amount of current means the average pulsed current over a fixed amount of time or, alternatively, the steady-state value if a different embodiment of the invention is used which does not pulse the current.

Although control of clamping force can be obtained by open-loop control of the voltage on the base of transistor 62, the preferable system shown in FIG. 3 utilizes closed-loop control circuitry whereby a signal proportional to clamping force is generated at the output of an amplifier 70 which senses the voltage differential across a current-sensing shunt resistor 72 interposed between the MOSFET 60 and ground. The current sensing (and thus force sensing) output signal of amplifier 70 is compared by a comparator 74 with a current demand (and thus force demand) signal provided through line 76 to the comparator 74. The demand signal may be of different predetermined magnitudes, corresponding to different predetermined magnitudes of desired clamping force, as selected by force demand circuitry indicated generally as 78, to be described hereafter. The comparator 74 compares the actual current level through the motors 28, representative of clamping force, to the desired level indicated by the demand signal in line 76. The output of the comparator 74 will be low until the level of the output from amplifier 70 reaches the same level as the signal in line 76, at which time the output of comparator 74 changes from low to high. The low or high output, as the case may be, of comparator 74 is transmitted through a further comparator 80 (having hysteresis) and through a pair of NOR gates 82 and 84 (the gate 84 being connected to function as an inverter so that the combination of the two gates acts as a single OR gate) and through line 86 to the base of transistor 62, thereby controlling the MOSFET 60.

The operation of the MOSFET 60 under the control of the closed-loop, force-sensing feedback circuit just described is as follows. At start-up there is a high voltage at the base of transistor 62 through the pullup resistor 88. This high voltage at the base of transistor 62 turns off the MOSFET 60. With no current flowing through MOSFET 60, the output of amplifier 70 is low. Such low output is transmitted through comparators 74 and 80 back to the base of transistor 62 through line 86, which thereby turns MOSFET 60 on. When the MOSFET is on and driving current is therefore being supplied to the motors 28, the output of amplifier 70 becomes high enough to exceed the demand signal in line 76 and cause a high output from comparator 74 which is transmitted through line 86 back to the base of the transistor 62, which thereby turns off the MOSFET 60. Further rapid on/off cycling of the MOSFET 60 due to the feedback circuit pulses the current through the motors 28 to achieve an effective amount of current which is both substantially no less than, and substantially no greater than, that demanded by the demand circuit 78 to achieve the desired clamping force.

It should be noted that although the MOSFET 60 controls the effective amount of electric current driving the electric motors 28, the amount of current through the MOSFET during a particular current pulse is a function of the motors and of the MOSFET itself. As long as the MOSFET is turned on, it will allow as much current flow as the external circuit (i.e. the motors) demands, subject to its own electrical limits.

The clamping force demand circuit 78 permits the selection of any one of several different predetermined magnitudes of clamping force by delivering one of several different predetermined signal levels through line 76 to comparator 74, such different signal levels corresponding to different desired motor current levels which in turn correspond to different desired clamping forces. The demand circuit 78 provides for three such different predetermined signal levels, although a greater or lesser number could be provided. The selection of signal level depends upon which of the three outputs 90, 92 or 94 of a series 4016 bilateral switch 96 (manufactured as a standard item by RCA and many other manufacturers) is selected. Selection is accomplished by opening one of three clamp force selection relay switches 98, 100, 102 on the vehicle 10, isolating the corresponding input 104, 106 or 108, to which the respective switch 98, 100 or 102 is connected, from ground and thereby causing a high signal in that input.

The individual magnitudes of the three different demand signals available to be transmitted through line 76 are adjustably settable by variable resistors 110, 112 and 114 respectively. Each signal magnitude can be calibrated to a particular clamping force initially by varying the resistor 110, 112 or 114 while applying a clamping force measured by a mechanical force transducer. After each resistor setting corresponding to a desired clamping force is obtained, the magnitude of the signal in line 76 corresponding to the force can be recorded from a reading of meter 116. Thereafter the meter can be checked periodically to determine if the clamp force settings have diverged from their original adjustments.

The current control circuit of FIG. 3 cannot allow the continuous supply of effective current to the motors 28 for as long as a load is clamped because such continuous supply of current would overheat and damage the motors, as well as drawing excessive power from the vehicle batteries. Accordingly, the current control circuit is designed to interrupt the effective amount of current driving the motors 28 while the load is clamped, without relieving the required clamping force.

As mentioned previously a conventional, one-way, spring-wrap-type brake 42 permits turning of the motor-driven screw member 18 in a direction to close the clamp arms 16, while preventing turning of the screw member in the opposite direction unless released by actuation of a solenoid 44. Thus, after the motors 28 have applied the required clamping force to the load, the supply of effective current to the motors can be interrupted without loss of clamping force, at least temporarily, because the brake 42 will prevent release of the clamping force. However for various reasons, including compression of the load and mechanical slip, maintenance of the required clamping force by the brake 42 indefinitely cannot be relied upon.

Accordingly, the circuit of FIG. 3 is equipped to provide timed interruptions of the effective current driving the motors 28, separated by intermittent reclampings. As used herein, interruptions of the effective electric current to the motors 28 does not refer to the durations between individual rapid pulses of the current under the pulsing control of the MOSFET 60 to obtain desired effective current level. Rather such interruptions refer to much longer periods of time during which the pulsing of the MOSFET 60 is stopped altogether while the load is clamped by disabling the MOSFET.

Figure 4:
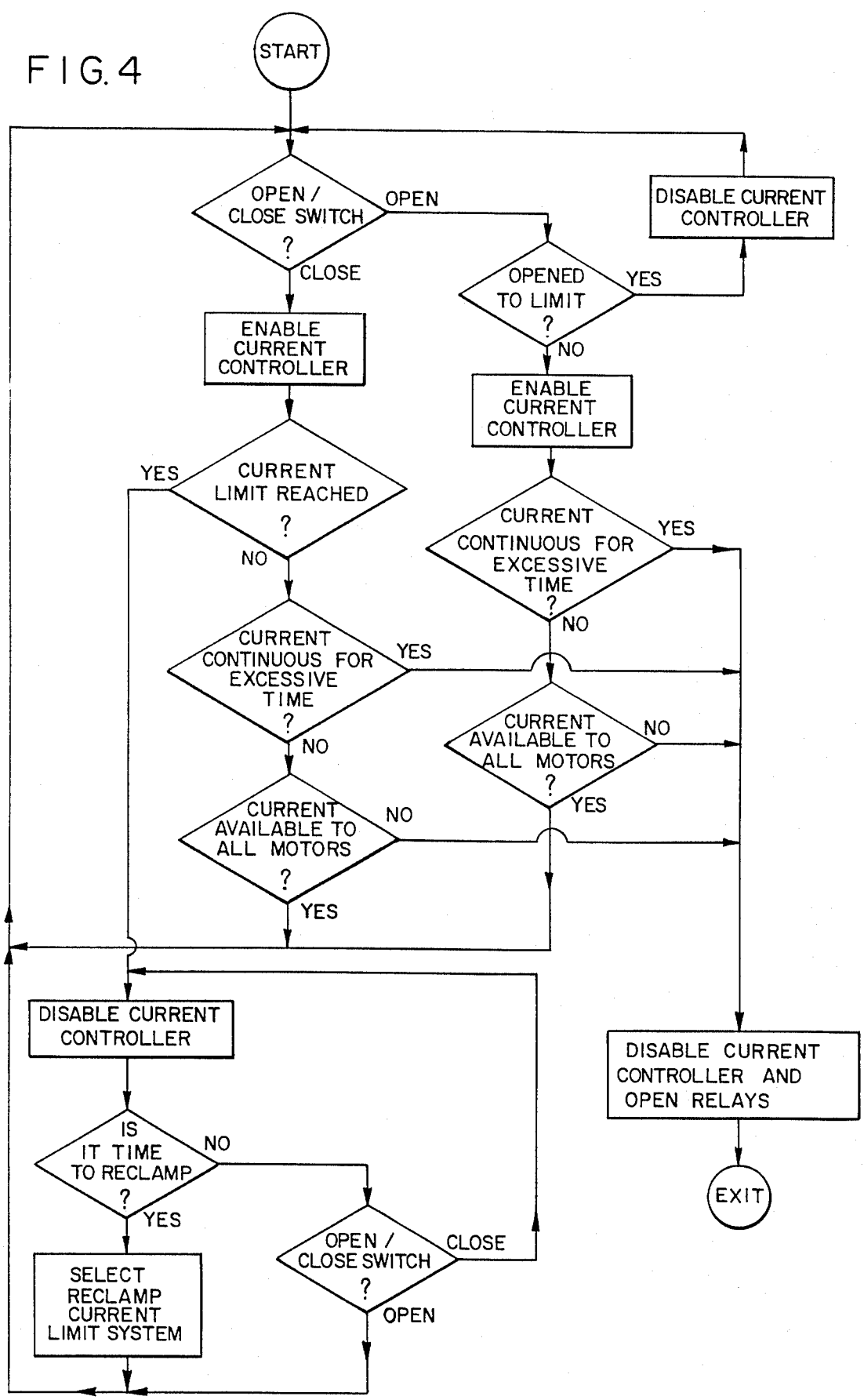
FIG. 4 is an exemplary logic flow diagram according to which the microprocessor of FIG. 3 is programmed.

The sequencing of the intermittent reclampings and interruptions of effective current to the motors 28 is controlled by a microprocessor 118 which may be of any conventional type, such as a Motorola model 6802. The microprocessor 118 is programmed to operate in accordance with the logic flow diagram of FIG. 4. It senses the position of a clamp open/close command relay switch 120 and actuates the direction control relays 52 and 54 by means of outputs 122 and 124 accordingly. Relay 120 is a normally open switch which, in its open condition, is read by the microprocessor as indicating a clamp closure command. This is a safety feature because, if the relay 120 should inadvertently become disconnected from its actuating circuit, it will automatically assume its normal, unactuated, open condition which commands clamp closure, thereby preventing the clamp from releasing a load which it may be carrying at the time that the inadvertent disconnection occurs.

If a clamp closure command is given by relay 120, the MOSFET current controller 60 initially operates in the pulsed feedback mode described above. However, as soon as the desired effective amount of current, corresponding to that demanded by the signal in line 76, has been maintained for a predetermined period of time long enough to eliminate erroneous transient readings from current in-rush, the microprocessor detects that fact in the form of a high signal through input 126. In response thereto, the microprocessor 118 issues a continuous high signal through output 128, causing a corresponding high signal to be transmitted back through line 86 to transistor 62, disabling the MOSFET 60 regardless of the resultant interruption of effective current through the motors 28 as sensed by the current sensing portion of the circuit. Thus the MOSFET 60 is disabled from performing its current controlling pulsing function and effective current is interrupted so long as the microprocessor generates a high output signal through output 128.

This disabling of the current-controlling MOSFET 60 by the output of the microprocessor, in response to the attainment of desired clamping force as determined by the current-sensing portion of the circuit, continues for a predetermined period of time determined by presetting of the microprocessor's timer. Thereafter, the microprocessor discontinues the high signal through output 128 and thus enables the MOSFET 60 to resume its pulsed, current-controlling function until the desired clamping force is once more attained and the MOSFET is again disabled. This cyclic operation of establishing and interrupting effective current to the motors 28 by the intermittent enabling and disabling of the MOSFET 60 continues indefinitely as long as the relay 120 demands clamp closure. The time periods during which the MOSFET 60 is disabled can vary. Preferably the first time period after initial load clamping would be no greater than one or two seconds to ensure that initial clamping of the load has actually occurred at the desired clamping force. Thereafter, disabling of the MOSFET 60 could occur for durations from one minute to several minutes.

Since all electric motors experience the condition called current in-rush when they start, due to the initially low reactive component of their impedance, the problems caused by the temporarily high initial current must be dealt with. On initial clamping, the primary problem is the possible sensing by the current control circuit of a misleading high current, and the resultant premature disabling of the MOSFET, before the desired clamping force is actually reached. This problem is obviated partially by the aforementioned hysteresis or delay built into comparator 80, and partially by the requirement of the microprocessor that the high input of line 126 be sensed for a predetermined period of time before the microprocessor issues its disabling signal through output 128. Also, the fact that the current-sensing portion of the circuit senses the total of the effective currents delivered simultaneously to all of the electric motors 28, rather than sampling the current through less than all of the motors, guards against current readings which are not representative of clamping force which might otherwise result from nonuniform loading of the motors.

A second type of current in-rush problem must be dealt with during reclamping of an already clamped load. Due to in-rush and the tendency of the motors to move in response to the initial application of current to reclamp the load, there will be a tendency to apply excessive clamping force during a reclamping sequence if current level is controlled by the MOSFET 60 in the same manner as for initial clamping. Since the objective is not to obtain greater clamping force on reclamping, but rather merely to ensure that the previously applied clamping force is maintained, the demand circuit 78 is equipped to alter the signal which it provides to comparator 74 through line 76 during a reclamping cycle. Signals from the microprocessor 118 through outputs 130 and 132 cause a second series 4016 bilateral switch 134 to interrupt the normal connection between the output of bilateral switch 96 and line 76, while enabling a substitute reclamp current demand signal (which is a predetermined percentage of the normal demand signal by virtue of the setting of variable resistor 136) to be transmitted through the switch 134 from line 138 to line 76. Thus, the current demand signal on reclamping is less than the current demand signal on initial clamping, to compensate for the tendency to overclamp. Also, as an additional compensation, the microprocessor 118 through its outputs to the bilateral switch 134 causes the signal 76 to increase gradually to the reduced level dictated by the setting of the resistor 136. As before, the reduced reclamping current demand levels can be calibrated to achieve the required reclamping force by setting the resistor 136 at the level which achieves a reclamping force equal to the original clamping force, as indicated by a mechanical clamping force transducer during calibration.

Opening of the clamp arms 16 is commanded by closure of the open/close control switch 120, in response to which the microprocessor 118 actuates the relays 52 while simultaneously actuating the solenoid 44 by means of relay 139 to release the one-way brake 42. The motors are driven under the current control of MOSFET 60 in a direction to open the arms until such time as one of the two limit switches 38 and 40 (depending upon the limit determined by a selector 140) has been contacted by arm 36 on the clamp equalizing chain. Such contact opens the normally closed limit switch and thereby deactivates a normally open relay switch 142, indicating that the clamp arms have moved to their open limits. The opening of relay 142 causes the microprocessor 118 to generate a high output through line 128 thereby disabling the MOSFET 60.

A feature which significantly extends the life of the direction switching relays 52 and 54 is that, in the absence of a malfunction, the microprocessor will not switch the relays either to their off positions or to their opposite direction positions unless the MOSFET 60 has previously been disabled. Thus, unless there is a system malfunction, the relays 52 and 54 do not switch under a load.

The possible system malfunctions which the circuit of FIG. 3 is equipped to check and guard against are:
1. low battery voltage;
2. no current to one or more motors; and
3. enablement of the MOSFET 60 for an excessive period of time.

In case any of these malfunctions or errors is detected, the circuit disables the MOSFET 60. In two of the cases the microprocessor also opens the relays 52 and 54.

The first malfunction condition, i.e. low battery supply voltage, is sensed by a detector circuit indicated generally as 144 in FIG. 3. Under normal conditions, transistor 146 is held in a conducting state by the conduction of zener diode 148 which has a breakdown voltage lower than that to which it is exposed. The resultant high potential placed on the base of transistor 146 exposes line 150 to ground, creating a low signal therein. However if the battery voltage should drop to a predetermined fraction (such as one-half) of its rated value, the voltage to which zener diode 148 is exposed will likewise drop proportionately and the zener diode will cease to conduct, exposing the base of transistor 146 to a low voltage and isolating line 150 from ground, thereby creating a high signal in line 150. The high signal in line 150 has the same effect on the feedback circuit as does a high signal in line 128, i.e. it disables MOSFET 60. The high signal in line 150 also illuminates an error LED 152 so that a repairman can readily identify the low battery voltage problem and correct it.

With respect to the second malfunction condition, if one or more of the motors 28 were to fail to receive driving current, insufficient clamping force and/or damage to the clamping mechanism could result. Accordingly the circuit of FIG. 3 is equipped to sense separately the effective amounts of electric current driving each of the motors 28 individually, and to respond to the absence of sufficient current through any one of the motors. In the circuit of each individual motor 28 is a silicon-controlled rectifier (SCR) 154. As long as there is effective current flowing through the respective motor, there will be a slight voltage drop across its SCR. The voltage across the SCR causes conduction of the internal LED of a respective optical coupler 156. When the LED conducts it causes the transistor portion of the optical coupler to conduct, which produces a low signal through its respective line 158, indicating the presence of effective current through its corresponding motor 28. Lines 158 of all of the optical couplers 156 are connected to a multi-input NOR gate 160. As long as all of the input signals to the NOR gate 160 are low, indicating effective current through all of the motors 28, the output of the gate 160 will be high indicating to the microprocessor that current is available to all of the motors. However, if effective current is absent in any one of the motors, a high output signal is generated in the respective line 158 associated with that motor and the output of the NOR gate 160 becomes low. The microprocessor 118 compares the resultant low output of the NOR gate 160 with its own output through line 128 to determine whether effective current should be available to the motors. If the output of line 128 is low, indicating that the MOSFET 60 is enabled, the microprocessor will sense a disagreement between the low signal in line 128 and the low output of NOR gate 160, and will respond by disabling MOSFET 60 and opening relays 52 and 54. This error condition can be cleared only by disconnecting the power to the system and turning it back on.

In order to prevent a third malfunction whereby the motors might run for an excessive period of time, microprocessor 118 times each period during which the MOSFET 60 is enabled. If that time period becomes excessive during either the closing or opening of the clamp arms, the microprocessor disables the MOSFET 60 and opens the relays 52 and 54 as described in the previous paragraph. Such excessive period of effective current supply by the MOSFET 60 would normally occur only when the demanded current level and resultant clamping force are not attained during load clamping or, alternatively, when one of the limit switches 38 or 40 is not opened during opening of the clamp arms.

In response to the above-described malfunctions, the microprocessor may also illuminate appropriate LED's indicating to the repairman the reason for the shutdown, and issue error signals to the vehicle 10 which can, in turn, also disable the vehicle.

The various time periods, delays and other parameters discussed above, which influence the functions of the circuit of FIG. 3, are subject to variation depending upon the structure of both the motors and the load clamp. However, for any particular structure, the optimum parameters are readily ascertainable by test operation of the load clamp while making appropriate adjustments to the parameters to optimize clamp performance.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. An electric motor-actuated load-engaging clamp adapted to be fitted to a materials handling machine comprising:
    (a) a frame adapted to extend vertically and transversely relative to said machine;
    (b) a pair of selectively openable and closeable clamp arms extending forwardly from said frame movably mounted thereon for transverse movement relative to said frame and to each other;
    (c) electric motor means connected to said clamp arms for selectively closing them by moving said clamp arms transversely relative to said frame toward each other and for imposing a clamping force on said clamp arms variably dependent upon the effective amount of electric current driving said electric motor means;
    (d) current control means connected to said electric motor means for variably controlling the effective amount of electric current driving said electric motor means;
    (e) force sensing means for sensing the magnitude of clamping force imposed on said clamp arms by said electric motor means;
    (f) force demand means for selectively commanding said current control means to cause said electric motor means to impose a selected one of a plurality of different predetermined magnitudes of clamping force on said clamp arms by delivering one of a plurality of different predetermined effective amounts of electric current to said electric motor means, each of said predetermined effective amounts of electric current corresponding to one of said predetermined magnitudes of clamping force; and
    (g) comparing means connected to said current control means, said force sensing means, and said force demand means, respectively, for comparing the magnitude of clamping force sensed by said force sensing means with the magnitude of clamping force commanded by said force demand means and for causing said current control means to control the effective amount of electric current delivered to said electric motor means at an effective amount substantially equal to the effective amount which corresponds to the magnitude of clamping force commanded by said force demand means.

2. The load-engaging clamp of claim 1 wherein said electric motor means comprises a plurality of electric motors and said force sensing means comprises means for sensing the total of the effective amounts of electric current delivered simultaneously to said plurality of electric motors.

3. The load-engaging clamp of claim 1 wherein said force sensing means comprises means for sensing the effective amount of electric current driving said electric motor means, further including means for delaying the response of said current control means to said force sensing means for a period of time sufficient to prevent response by said current control means to any transient effective amount of current sensed by said force sensing means resulting from the initial delivery of current to said electric motor means during the start-up of said motor means.

4. An electric motor-actuated load-engaging clamp adapted to be fitted to a materials handling machine comprising:
   (a) a frame adapted to extend vertically and transversely relative to said machine;
   (b) a pair of selectively openable and closeable clamp arms extending forwardly from said frame movably mounted thereon for transverse movement relative to said frame and to each other;
   (c) electric motor means connected to said clamp arms for selectively closing them by moving said clamp arms transversely relative to said frame toward each other and for imposing a clamping force on said clamp arms variably dependent upon the effective amount of electric current driving said electric motor means;
   (d) current control means connected to said electric motor means for variably controlling the effective amount of electric current driving said electric motor means;
   (e) force sensing means for sensing the magnitude of clamping force imposed on said clamp arms by said electric motor means and sensing when the magnitude of clamping force imposed on said clamp arms by said electric motor means is no less than a predetermined magnitude;
   (f) means connected to said current control means and to said force sensing means for causing said current control means to interrupt the effective amount of electric current driving said electric motor means in response to said magnitude of clamping force being no less than said predetermined magnitude;
   (g) holding means connected to said clamp arms for maintaining said magnitude of clamping force while said current control means interrupts said effective amount of electric current; and
   (h) timer means connected to said current control means for causing said current control means to establish an effective amount of electric current driving said electric motor means after a predetermined period of time during which the effective amount of electric current driving said electric motor means has been interrupted.

5. The load-engaging clamp of claim 4 wherein said means connected to said current control means and to said force sensing means includes means for sensing the duration during which said magnitude of clamping force is no less than said predetermined magnitude, and causing said current control means to interrupt the effective amount of electric current when said duration is of a predetermined length.

6. The load-engaging clamp of claim 4, further including means connected to said current control means for causing said current control means to limit the effective amount of electric current driving said electric motor means, after said predetermined period of time, to an amount insufficient to impose a clamping force on said clamp arms of a magnitude substantially greater than said predetermined magnitude.

7. The load-engaging clamp of claim 4, further including means connected to said current control means for causing said current control means to establish an effective amount of electric current driving said electric motor means, after said predetermined period of time, which corresponds to a clamping force on said clamp arms of a magnitude substantially equal to said predetermined magnitude.

8. The load-engaging clamp of claim 4, further including means connected to said current control means for causing said current control means to limit the effective amount of electric current driving said electric motor means, after said predetermined period of time, to an amount less than the effective amount of electric current driving said electric motor means prior to said predetermined period of time.

9. The load-engaging clamp of claim 4, further including means connected to said current control means for causing said current control means to limit the effective amount of electric current driving said electric motor means, after said predetermined period of time, to gradually increasing amounts less than the effective amount of electric current driving said electric motor means prior to said predetermined period of time.

10. An electric motor-actuated load-engaging clamp adapted to be fitted to a materials handling machine comprising:
    (a) a frame adapted to extend vertically and transversely relative to said machine;
    (b) a pair of selectively openable and closeable clamp arms extending forwardly from said frame movably mounted thereon for transverse movement relative to said frame and to each other;
    (c) electric motor means connected to said clamp arms for selectively closing them by moving said clamp arms transversely relative to said frame toward each other and for imposing a clamping force on said clamp arms variably dependent upon the effective amount of electric current driving said electric motor means;
    (d) current control means connected to said electric motor means for variably controlling the effective amount of electric current driving said electric motor means;
    (e) current demand means for selectively causing said current control means to control the effective amount of electric current delivered to said electric motor means at an effective amount substantially equal to a selected one of a plurality of different predetermined effective amounts; and
    (f) adjustment means connected to said current demand means for variably adjusting said plurality of different predetermined effective amounts.

11. An electric motor-actuated load-engaging clamp adapted to be fitted to a materials handling machine comprising:
    (a) a frame adapted to extend vertically and transversely relative to said machine;
    (b) a pair of selectively openable and closable clamp arms extending forwardly from said frame movably mounted thereon for transverse movement relative to said frame and to each other;
    (c) electric motor means connected to said clamp arms for selectively closing and opening them by moving said clamp arms transversely relative to said frame selectively toward or away from each other, respectively; and
    (d) direction control means connected to said electric motor means for selectively reversibly operating said electric motor means to close or open said clamp arms, said direction control means including selectively closable and openable electric circuit means for causing said electric motor means to close said clamp arms in response to the opening of said electric circuit means so as to close said clamp arms in response to an inadvertent disconnection occurring in said electric circuit means, and to open said clamp arms in response to the closing of said electric circuit means.

12. An electric motor-actuated load-engaging clamp adapted to be fitted to a materials handling machine comprising:
(a) a frame adapted to extend vertically and transversely relative to said machine;
(b) a pair of selectively openable and closeable clamp arms extending forwardly from said frame movably mounted thereon for transverse movement relative to said frame and to each other;
(c) electric motor means connected to said clamp arms for selectively closing them by moving said clamp arms transversely relative to said frame toward each other and for imposing a clamping force on said clamp arms dependent upon the effective amount of electric current driving said electric motor means, said electric motor means comprising a plurality of electric motors;
(d) current sensing means for sensing separately the effective amount of electric current driving each of said plurality of electric motors individually; and
(e) current control means responsive to said current sensing means and connected to said electric motors for interrupting the effective amount of electric current driving all of said electric motors in response to the sensing, by said current sensing means, of less than a predetermined effective amount of electric current driving any one of said electric motors.

13. An electric motor-actuated load-engaging clamp adapted to be fitted to a materials handling machine comprising:
(a) a frame adapted to extend vertically and transversely relative to said machine;
(b) a pair of selectively openable and closeable clamp arms extending forwardly from said frame movably mounted thereon for transverse movement relative to said frame and to each other;
(c) electric motor means connected to said clamp arms for selectively closing them by moving said clamp arms transversely relative to said frame toward each other and for imposing a clamping force on said clamp arms variably dependent upon the effective amount of electric current driving said electric motor means;
(d) timer means for sensing the period of time during which an effective amount of electric current drives said electric motor means; and
(e) current control means connected to said electric motor means and responsive to said timer means for interrupting the effective amount of electric current driving said electric motor means in response to said period of time, as sensed by said timer means, exceeding a predetermined period of time.

* * * * *